(12) United States Patent
Goyal et al.

(10) Patent No.: US 12,462,286 B2
(45) Date of Patent: Nov. 4, 2025

(54) SYSTEM AND METHOD FOR DETERMINING A COMPETITIVENESS VALUE

(71) Applicant: FLIPKART INTERNET PRIVATE LIMITED, Bengaluru (IN)

(72) Inventors: Shivam Goyal, Guna (IN); Shyam Beriwal, Bangalore (IN); Nir Shahaf, Ramat (IL); Akarsh Jain, Bareilly (IN); Anoop Ragolu, Srikakulam (IN)

(73) Assignee: FLIPKART INTERNET PRIVATE LIMITED, Bengaluru (IN)

( * ) Notice: Subject to any disclaimer, the term of this patent is extended or adjusted under 35 U.S.C. 154(b) by 350 days.

(21) Appl. No.: 17/987,059

(22) Filed: Nov. 15, 2022

(65) Prior Publication Data

US 2023/0153882 A1 May 18, 2023

(30) Foreign Application Priority Data

Nov. 18, 2021 (IN) .............................. 202141053060

(51) Int. Cl.
 *G06Q 30/00* (2023.01)
 *G06Q 30/0201* (2023.01)
 *G06Q 30/0601* (2023.01)

(52) U.S. Cl.
 CPC ..... *G06Q 30/0629* (2013.01); *G06Q 30/0206* (2013.01); *G06Q 30/0627* (2013.01)

(58) Field of Classification Search
 CPC ............................................... G06Q 30/06–08
 See application file for complete search history.

(56) References Cited

U.S. PATENT DOCUMENTS

| 7,302,429 | B1 * | 11/2007 | Wanker | G06Q 30/0623 |
| | | | | 707/999.005 |
| 9,697,551 | B1 * | 7/2017 | Bilger | G06Q 30/0609 |
| 2016/0328765 | A1 * | 11/2016 | Pang | G06Q 30/0631 |
| 2019/0180301 | A1 * | 6/2019 | Mahalanobish | H04W 4/35 |
| 2024/0346538 | A1 * | 10/2024 | Tilly | G06Q 30/0283 |

OTHER PUBLICATIONS

Trivedi, Minakshi, "Distribution Channels: An Extension of Exclusive Retailership", Management Science 44.7: 896-909, Institute for Operations Research and the Management of Sciences, Jul. 1998 (Year: 1998).*

* cited by examiner

*Primary Examiner* — Ethan D Civan
(74) *Attorney, Agent, or Firm* — Greenberg Traurig, LLP

(57) ABSTRACT

A system and method for determining a competitiveness value for set(s) of substitutable items. The method comprises determining, a relative demand value of each set from the set(s) of substitutable items based on a normalized demand value of said each set of substitutable items determined for each of a plurality of digital platforms. The method thereafter comprises identifying, a first target digital platform for each set of substitutable items, based on a demand weighted average selling price of said each received set of substitutable items for one or more of the plurality of digital platforms. Further, to determine the competitiveness value, the method comprises identifying, a second target digital platform for the set(s) of substitutable items based on the first target digital platform identified for each set of substitutable items and a relative demand value of said each set of substitutable items.

14 Claims, 1 Drawing Sheet

SYSTEM AND METHOD FOR DETERMINING A COMPETITIVENESS VALUE

RELATED APPLICATION

This application claims priority under 35 U.S.C. § 119 to Indian Patent Application No. 202141053060, filed on Nov. 18, 2021, the entire contents of which are incorporated herein by reference

TECHNICAL FIELD

The present invention generally relates to competitiveness analysis and more particularly to systems and methods for determining a competitiveness value for one or more sets of substitutable items.

BACKGROUND OF THE DISCLOSURE

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as an admission of the prior art.

In the past few years a number of technologies have been developed to provide various facilities to users of electronic devices. For instance, some of these technologies provide to the users, facilities such as to buy/sell various products and/or to avail various services at any instant of time via accessing digital platforms (such as an e-commerce platform) on the electronic devices. Also, there are a number of digital platforms that provide the same type of facilities to the users. Therefore, the users can avail a specific facility from a digital platform that is providing a best value of said specific facility as compared to other digital platforms that are providing similar specific facility. For instance, a product say 'ABC shirt' may be available on three e-commerce platforms for a price of 1000 INR, 1200 INR and 1500 INR, therefore in the given example the e-commerce platform on which the 'ABC shirt' is available at the price of 1000 INR may be preferred by the users to purchase the 'ABC shirt'.

Therefore, competitive valuation plays an important role in selection of a facility offered on various digital platforms, for instance, competitive pricing is one of the most important drivers of price perception. Therefore, currently the digital platforms are looking for various ways (for instance: offering Private Labels, Derivatives (Value engineered products) and Exclusive brands through licensing etc.), to provide better value to the users/customers. Also, there are a number of technical solutions that have been developed over a period of time to track a competitor's product prices to further use it in real time pricing and price optimization. For instance, some of the currently known solutions provide a system for automated price tracking and analysis that serves a use case for dynamic one to one price comparison. Some other currently known solutions disclose a collection of competitive pricing information via a merchant website for use in setting prices on the merchant website. Also, some other currently known solutions focus on how pricing and competitive effects interact as a general phenomenon, particularly as it applies to retailing. All such known technical solutions have various limitations, such as in these solutions, a pricing of a particular product is considered in individuality to evaluate an impact of competitors' pricing, but these solutions ignore the importance of selection and pricing of similar/substitutable products.

Furthermore, in the current hyper competitive retail landscape, offering best values (such as best prices) on every product is not sustainable. The currently known solutions deal with comparing prices for exactly similar products available across digital platforms (and not at a cohort level), which is not efficient as just comparing the prices on a common set of products may not give the right competitive intelligence. Thus, there is a requirement to measure price competitiveness at a group level and use it in making a broader pricing and selection strategy which is not possible with the existing solutions.

Therefore, there is a need in the art to provide a method and system for determining a competitiveness value for one or more sets of substitutable items.

SUMMARY OF THE DISCLOSURE

This section is provided to introduce certain objects and aspects of the present invention in a simplified form that are further described below in the detailed description. This summary is not intended to identify the key features or the scope of the claimed subject matter.

In order to overcome at least some of the drawbacks mentioned in the previous section and those otherwise known to persons skilled in the art, an object of the present invention is to provide a method and system for determining a competitiveness value for one or more sets of substitutable items. Another object of the present invention is to provide a cohort based approach to enable a price benchmarking w.r.t. competition. Also, an object of the present invention is to define a cohort/set of substitutable items based on a category, an item type, a brand, one or more attributes and a price bucket. Further, an object of the present invention is to measure a competitiveness value for a digital platform w.r.t. its competition at the level of a group of products/items that are substitutable. Also, an object of the present invention is to provide a solution for making a broader pricing and selection strategy which is not possible with the existing solutions. Further an object of the present invention is to analyze a demand of each substitutable item within each set of substitutable items present in a market, to determine a relative market demand. Another object of the present invention is to analyze for a digital platform, a demand of each substitutable item within each set of substitutable items present in a market based on an internal demand dataset of said digital platform and a publically available demand data of one or more competitors of said digital platform. Also, an object of the present invention is to identify a digital platform that is providing the best value in terms of price, based on a demand weighted average selling price of each set of substitutable items present in a market for various digital platforms. Yet another object of the present invention is to identify a digital platform that is providing a better competitiveness value (such as a better price value) in an overall market demand.

Furthermore, in order to achieve the aforementioned objectives, the present invention provides a method and system for determining a competitiveness value for one or more sets of substitutable items.

A first aspect of the present invention relates to the method for determining a competitiveness value for one or more sets of substitutable items. The method encompasses receiving, at a transceiver unit, the one or more sets of substitutable items, wherein each of the one or more sets of substitutable items is at least associated with an item-category present on a plurality of digital platforms. The method further comprises determining, by a processing unit, for each of the plurality of digital platforms, a normalized demand value of each received set of substitutable items. Further the method comprises determining, by the processing unit, a relative demand value of each received set of substitutable items based on the normalized demand value of said each received set of substitutable items determined for each of the plurality of digital platforms. The method thereafter comprises identifying, by an identification unit, a first target digital platform for each received set of substitutable items, based on a demand weighted average selling price of said each received set of substitutable items for one or more of the plurality of digital platforms. Further the method comprises identifying, by the identification unit, a second target digital platform for the one or more sets of substitutable items based on the first target digital platform identified for each received set of substitutable items and a relative demand value of said each received set of substitutable items. The method thereafter leads to determining, by the processing unit, the competitiveness value for the one or more sets of substitutable items based on the second target digital platform identified for the one or more sets of substitutable items.

Another aspect of the present invention relates to a system for determining a competitiveness value for one or more sets of substitutable items. The system comprises transceiver unit, configured to receive, the one or more sets of substitutable items, wherein each of the one or more sets of substitutable items is at least associated with an item-category present on a plurality of digital platforms. The system further comprises a processing unit, configured to determine, for each of the plurality of digital platforms, a normalized demand value of each received set of substitutable items. Also, the processing unit is configured to determine a relative demand value of each received set of substitutable items based on the normalized demand value of said each received set of substitutable items determined for each of the plurality of digital platforms. The system also comprises an identification unit, configured to identify, a first target digital platform for each received set of substitutable items, based on a demand weighted average selling price of said each received set of substitutable items for one or more of the plurality of digital platforms. The identification unit is also configured to identify a second target digital platform for the one or more sets of substitutable items based on the first target digital platform identified for each received set of substitutable items and a relative demand value of said each received set of substitutable items. Furthermore, the processing unit of the system is further configured to determine the competitiveness value for the one or more sets of substitutable items based on the second target digital platform identified for the one or more sets of substitutable items.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

Figure 1:
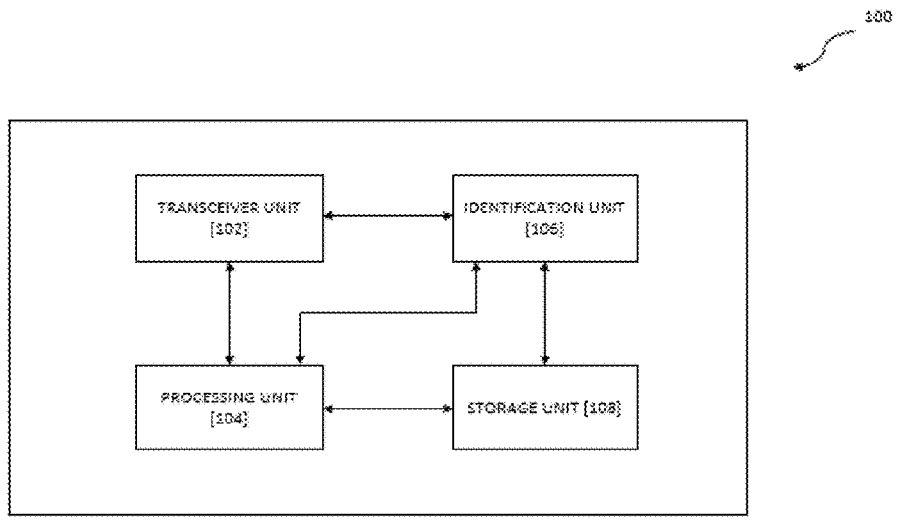
FIG. 1 illustrates an exemplary block diagram of a system [100], for determining a competitiveness value for one or more sets of substitutable items, in accordance with exemplary embodiments of the present invention.

The foregoing shall be more apparent from the following more detailed description of the disclosure.

DESCRIPTION OF THE INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address any of the problems discussed above or might address only some of the problems discussed above.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth.

Specific details are given in the following description to provide a thorough understanding of the embodiments. However, it will be understood by one of ordinary skill in the art that the embodiments may be practiced without these specific details. For example, circuits, systems, processes, and other components may be shown as components in block diagram form in order not to obscure the embodiments in unnecessary detail.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, a "processing unit" or "processor" or "operating processor" includes one or more processors, wherein processor refers to any logic circuitry for processing instructions. A processor may be a general-purpose processor, a special purpose processor, a conventional processor, a digital signal processor, a plurality of microprocessors, one or more microprocessors in association with a DSP core, a controller, a microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor or processing unit is a hardware processor.

As used herein, "a user equipment", "a user device", "a smart-user-device", "a smart-device", "an electronic device", "a mobile device", "a handheld device", "a wireless communication device", "a mobile communication device", "a communication device" may be any electrical, electronic and/or computing device or equipment, capable of implementing the features of the present disclosure. The user equipment/device may include, but is not limited to, a mobile phone, smart phone, laptop, a general-purpose computer, desktop, personal digital assistant, tablet computer, wearable device or any other computing device which is capable of implementing the features of the present disclosure. Also, the user device may contain at least one input means configured to receive an input from a transceiver unit, a processing unit, an identification unit, a storage unit and any other such unit(s) which are required to implement the features of the present disclosure.

As used herein, "storage unit" or "memory unit" refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media. The storage unit stores at least the data that may be required by one or more units of the system to perform their respective functions.

As disclosed in the background section, existing technologies have many limitations and in order to overcome at least some of the limitations of the prior known solutions, the present disclosure provides a cohort based approach that enables a value (such as a price) benchmarking for a digital platform w.r.t. its competition. More specifically, the present invention provides a solution for determining a competitiveness value for one or more sets of substitutable items. Each set of substitutable items comprises one or more substitutable items that may be present on one or more of digital platforms. Also, for different digital platforms a set of substitutable items may include one or more similar items and/or one or more different items of similar configurations. For example, for 2 e-commerce platforms, a set of substitutable air conditioners may include one or more same air conditioners and/or one or more air conditioners that are different (such as in terms of model, color and/or like parameters) but are of the same configuration. Further, the present invention in order to determine the competitiveness value for the one or more sets of substitutable items firstly encompasses determining: a relative demand value of each set of substitutable items, and a digital platform that is providing a best value in terms of price for said each set of substitutable items. The present invention thereafter comprises determining a digital platform that is providing a better value for an overall market demand based on the determined digital platform that is providing the best value in terms of price for each set of substitutable items and the relative demand value of said each set of substitutable items. Thereafter, the present invention encompasses determining the competitiveness value for the one or more sets of substitutable items based on the digital platform that is providing the better value for the overall market demand.

Therefore, the present invention provides a novel solution of determining the competitiveness value for the one or more sets of substitutable items. Also, the present invention provides a technical advancement over the currently known solutions at least by providing a cohort based approach that enables a value benchmarking for a digital platform w.r.t. its competition, wherein the cohort/set of substitutable items is defined based on a category, an item type, a brand, one or more attributes and a price bucket. The present invention also provides a technical advancement over the currently known solutions by providing a solution for making a broader pricing and selection strategy which is not possible with the existing solutions. Also, the present invention provides a technical advancement over the currently known solutions by identifying a digital platform that is providing the best value in terms of price. Furthermore, the present invention also provides a technical advancement over the currently known solutions by identifying a digital platform that is providing a better price value in an overall market demand.

Hereinafter, exemplary embodiments of the present disclosure will be described in detail with reference to the accompanying drawings so that those skilled in the art can easily carry out the present disclosure.

Referring to FIG. 1, an exemplary block diagram of a system [100] for determining a competitiveness value for one or more sets of substitutable items is shown. The system [100] comprises at least one transceiver unit [102], at least one processing unit [104], at least one identification unit [106] and at least one storage unit [108]. Also, all of the components/units of the system [100] are assumed to be connected to each other unless otherwise indicated below. Also, in FIG. 1 only a few units are shown, however, the system [100] may comprise multiple such units or the system [100] may comprise any such numbers of said units, as required to implement the features of the present disclosure. Further, in an implementation, the system [100] may be present in a server device to implement the features of the present invention.

The system [100] is configured to determine a competitiveness value for one or more sets of substitutable items, with the help of the interconnection between the components/units of the system [100].

The transceiver unit [102] of the system [100] is connected to the at least one processing unit [104], the at least one identification unit [106] and the at least one storage unit [108]. Also, the transceiver unit [102] may include but not limited to a transmitter to transmit data to one or more destinations and a receiver to receive data from one or more sources. Further, the transceiver unit [102] may include any other similar unit obvious to a person skilled in the art, to implement the features of the present invention. The transceiver unit [102] may convert data or information to signals and vice versa for the purpose of transmitting and receiving, respectively. Furthermore, the transceiver unit [102] is configured to receive, the one or more sets of substitutable items, wherein each of the one or more sets of substitutable items is at least associated with an item-category present on a plurality of digital platforms. The plurality of digital platforms comprises a digital platform and one or more competitor digital platforms of said digital platform, wherein said digital platform and the one or more competitor digital platforms of said digital platform are of the same kind. For example, if the digital platform is an e-commerce platform, its competitor digital platforms are also e-commerce platforms. Also, the item-category present on the plurality of digital platforms indicates a category of items that comprises various category types. For example: in case of e-commerce platforms an item-category may be electronics category which may further include various category types such as Mobile phones, Laptops etc. Also, in the given example, the transceiver unit [102] is configured to receive the one or more sets of substitutable items, wherein each of the one or more sets of substitutable items is at least associated with the item-categories such as Electronics, Lifestyle, Home, Travel etc. that may be present on an e-commerce platform and its competitor e-commerce platforms.

Also, each set of substitutable items from the one or more sets of substitutable items is associated with at least one of a category type, an item type, a brand, one or more attributes and a price range etc. More particularly, each of the one or more sets of substitutable items is defined based on the category type, the item type, the brand, the one or more attributes and the price range, but the same is not limited thereto. For instance, in case of e-commerce platforms, an exemplary set of substitutable items may be defined as below:

Air-Conditioner_Split_air_conditioner_ABC_5 star rating_Between 30,000 to 40,000 INR Where: Air-Conditioner (AC) is a category type, Split_air_conditioner is an item type, ABC is a brand, 5 star rating is an attribute and 30,000 to 40,000 INR is a price range.

Furthermore, each set of substitutable items from the one or more sets of substitutable items comprises one or more substitutable items that may be present on one or more digital platforms from the plurality of digital platforms. Also, for different digital platforms a set of substitutable items may include one or more same similar items and/or one or more different items of similar configurations. For instance, in the above example where for e-commerce platforms, the exemplary set of substitutable items is defined as below:

Air-Conditioner_Split_air_conditioner_ABC_5 star rating_Between 30,000 to 40,000 INR This exemplary set of substitutable items may comprises one or more substitutable items (i.e. one or more ACs that are of ABC brand and a split type with 5 star rating and price between 30 to 40 thousand INR) that may be present on one or more e-commerce platforms from the given e-commerce platforms. Also, say in the given example, if there are 3 e-commerce platforms namely EP 1, EP 2 and EP 3, then for each of the EP 1, EP 2 and EP 3 said exemplary set of substitutable items may include one or more same air conditioners and/or one or more air conditioners that are different (such as in terms of model, color and/or like parameters) but are of same configuration (such as category type, item type, brand, attribute(s) and/or price range etc.).

Further, once the one or more sets of substitutable items are received at the transceiver unit [102], the transceiver unit [102] is configured to provide the same to the processing unit [104]. The processing unit [104] is thereafter configured to determine, for each of the plurality of digital platforms, a normalized demand value of each received set of substitutable items. For example, if the plurality of digital platforms comprises an e-commerce platform and its 2 competitor e-commerce platforms, and in the given example 2 sets of substitutable items (say one for an item smartphone and other for an item smartwatch) are received. Then the processing unit [104] in the given example is configured to determine, for each of the e-commerce platform and its 2 competitor e-commerce platforms, a normalized demand value of each of the set of substitutable smartphones and the set of substitutable smartwatches.

Furthermore, the normalized demand value of each received set of substitutable items is determined based on a first dataset associated with the digital platform and a second dataset associated with the one or more competitor digital platforms of said digital platform. The first dataset comprises data indicating at least a demand of a plurality of substitutable items on the digital platform. The second dataset comprises data indicating at least a demand of a plurality of substitutable items on the one or more competitor digital platforms of the digital platform. The second dataset is a publicly available dataset and therefore may not provide an exact demand of the plurality of substitutable items on the one or more competitor digital platforms, therefore the normalized demand value of each received set of substitutable items is determined. Also, in an example for e-commerce platforms, the first dataset comprises data such as product page views, clicks on products, units etc. and the second dataset comprises data retrieved through web-crawls such as a count of ratings/reviews etc.

Once, the normalized demand value of said each received set of substitutable items is determined for each of the plurality of digital platforms, thereafter, the processing unit [104] is configured to determine, a relative demand value of each received set of substitutable items based on the normalized demand value of said each received set of substitutable items determined for each of the plurality of digital platforms. Furthermore, the Table 1 as provided below indicates: an exemplary normalized demand value (NDV) of three received set of substitutable items namely M1, M2 and M3 for three digital platforms namely P1, P2 and P3; and an exemplary relative demand value of each of the M1, M2 and M3:

TABLE 1

| Set of substitutable items | P1 demand data | P1 NDV | P2 demand data | P2 NDV | P3 demand data | P3 NDV | Relative demand value |
|---|---|---|---|---|---|---|---|
| M1 | 12,039 | 0.43 | 14,640 | 0.41 | 14,958 | 0.47 | 0.44 |
| M2 | 2,014 | 0.07 | 6,227 | 0.18 | 11,961 | 0.37 | 0.21 |
| M3 | 14,003 | 0.50 | 14,419 | 0.41 | 5,043 | 0.16 | 0.36 |

Also, the identification unit [106] of the system is configured to identify a first target digital platform for each received set of substitutable items, based on a demand weighted average selling price of said each received set of substitutable items for one or more of the plurality of digital platforms. More specifically, a first target digital platform for a set of substitutable items is a digital platform that is associated with a minimum demand weighted average selling price of said set of substitutable items. Also, the first target digital platform is identified from the plurality of digital platforms. Also, the demand weighted average selling price of each received set of substitutable items for the one or more of the plurality of digital platforms is determined based on at least one of the first dataset and the second dataset. Furthermore, Tables 2(1) and 2(2) as provided below indicate an exemplary data to determine a demand weighted average selling price of an exemplary set of substitutable items say S1 for digital platforms p1 and p2 respectively:

TABLE 2(1)

| Substitutable items of S1 present on p1 | Selling Price | Demand data determined based on a second dataset associated with p1 |
| --- | --- | --- |
| F1 | 32500 | 12000 |
| F2 | 33500 | 6000 |
| F3 | 33999 | 5000 |
| F3 | 34700 | 2000 |

Further, based on the data indicated in Table 2(1), a demand weighted average selling price of S1 for p1 may be 33,215.

TABLE 2(2)

| Substitutable items of S1 present on p2 | Selling Price | Demand data determined based on a second dataset associated with p2 |
| --- | --- | --- |
| A1 | 34500 | 10000 |
| A2 | 33900 | 8000 |
| A3 | 34490 | 3000 |

Further, based on the data indicated in Table 2(2), a demand weighted average selling price of S1 for p2 may be 34,270.

Furthermore, based on the above indicated exemplary demand weighted average selling price of S1 for p1 and p2, the identification unit [106] is configured to identify p1 as the first target digital platform for S1, as demand weighted average selling price of S1 for p1 is minimum.

Also, the identification unit [106] is thereafter configured to identify a second target digital platform for the one or more sets of substitutable items based on the first target digital platform identified for each received set of substitutable items and a relative demand value of said each received set of substitutable items. The second target digital platform is also identified from the plurality of digital platforms. Also, the second target digital platform for the one or more sets of substitutable items is a digital platform that is providing a better competitiveness value (i.e. a better price value) in a total market demand. Furthermore, Table 3 as provided below indicates: exemplary first target digital platforms (i.e., P1, P2 and P3) for exemplary sets of substitutable items (i.e., M1 to M8); and exemplary relative demand value of the sets of substitutable items (i.e., M1 to M8) to determine a second target digital platform:

TABLE 3

| Sets of substitutable items | First target digital platform | Relative demand value |
| --- | --- | --- |
| M1 | P1 | 0.20 |
| M2 | P2 | 0.05 |
| M3 | P3 | 0.10 |
| M4 | P3 | 0.12 |
| M5 | P1 | 0.10 |
| M6 | P1 | 0.25 |
| M7 | P2 | 0.01 |
| M8 | P1 | 0.06 |

Further, based on the exemplary data as indicated in the Table 3, the identification unit [106] is configured to identify P1 as the second target digital platform as P1 has a maximum contribution (i.e. 69%) in the M1 to M8 sets of substitutable items. Furthermore, the contribution of P1 (i.e. 69%) is further explained in Table 4 provided as below:

TABLE 4

| First target digital platform | Total Relative demand value | Total Share |
| --- | --- | --- |
| P1 | 0.61 | 69% |
| P2 | 0.06 | 7% |
| P3 | 0.22 | 25% |

Thereafter, once the second target digital platform is identified for the one or more sets of substitutable items, an indication of the same is provided to the processing unit [104] by the identification unit [106]. Further, the processing unit [104] is configured to determine the competitiveness value for the one or more sets of substitutable items based on the second target digital platform identified for the one or more sets of substitutable items. More specifically, as the second target digital platform is the digital platform that is providing the better competitiveness value (i.e. a better price value) in a total market demand (i.e. in all of the one or more received sets of substitutable items), the processing unit [104] is configured to determine, the competitiveness value for the one or more sets of substitutable items based on the second target digital platform.

Figure 2:
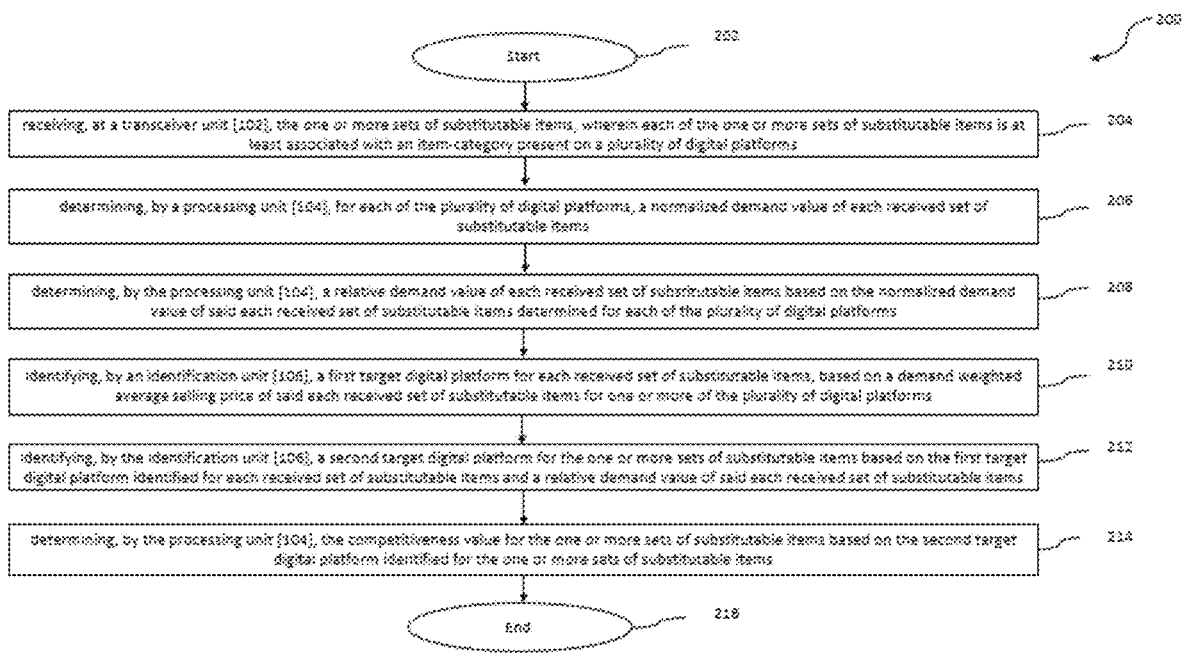
FIG. 2 illustrates an exemplary method flow diagram [200], for determining a competitiveness value for one or more sets of substitutable items, in accordance with exemplary embodiments of the present invention.

Referring to FIG. 2 an exemplary method flow diagram [200], for determining a competitiveness value for one or more sets of substitutable items, in accordance with exemplary embodiments of the present disclosure is shown. In an implementation the method is performed by the system [100]. Further, in an implementation, the system [100] is connected to a server unit to implement the features of the present disclosure. Also, as shown in FIG. 2, the method starts at step [202].

Further, the method at step [204] comprises receiving, at a transceiver unit [102], the one or more sets of substitutable items, wherein each of the one or more sets of substitutable items is at least associated with an item-category present on a plurality of digital platforms. The plurality of digital platforms comprises a digital platform and one or more competitor digital platforms of said digital platform, wherein said digital platform and the one or more competitor digital platforms of said digital platform are of the same kind. For example, if the digital platform is an e-commerce platform, its competitor digital platforms are also e-commerce platforms. Also, the item-category present on the plurality of digital platforms indicates a category of items that comprises various category types. For example: in case of e-commerce platforms an item-category may be a Fashion category which may further include various category types such as Men Fashion, Women Fashion, Kid's Fashion etc. Also, in the given example, the method comprises receiving by the transceiver unit [102], the one or more sets of substitutable items, wherein each of the one or more sets of substitutable items is at least associated with the item-categories such as Furniture, Sports, Fashion, Mobile etc. that may be present on an e-commerce platform and its competitor e-commerce platforms.

Also, each set of substitutable items from the one or more sets of substitutable items is associated with at least one of a category type, an item type, a brand, one or more attributes and a price range etc. More particularly, each of the one or more sets of substitutable items is defined based on the category type, the item type, the brand, the one or more attributes and the price range, but the same is not limited thereto. For instance, in case of e-commerce platforms, an exemplary set of substitutable items may be defined as below:

Smartphone_Foldable smartphone_AAA_Dual Camera_Between 50,000 to 80,000 INR Where: Smartphone is a category type, Foldable smartphone is an item type, AAA is a brand, Dual Camera is an attribute and 50,000 to 80,000 INR is a price range.

Furthermore, each set of substitutable items from the one or more sets of substitutable items comprises one or more substitutable items that may be present on one or more digital platforms from the plurality of digital platforms. Also, for different digital platforms a set of substitutable items may include one or more similar items and/or one or more different items of similar configurations. For instance, in the above example where for e-commerce platforms, the exemplary set of substitutable items is defined as below:

Smartphone_Foldable smartphone_AAA_Dual Camera_Between 50,000 to 80,000 INR Said exemplary set of substitutable items may comprises one or more substitutable items (i.e. one or more smartphones that are of AAA brand and a foldable type with dual camera and price between 50 to 80 thousand INR) that may be present on one or more e-commerce platforms from the given e-commerce platforms. Also, say in the given example, if there are 3 e-commerce platforms namely AP 1, AP 2 and AP 3, then for each of the AP 1, AP 2 and AP 3 said exemplary set of substitutable items may include one or more same smartphones and/or one or more smartphones that are different (such as in terms of model, color and/or like parameters) but are of same configuration (such as category type, item type, brand, attribute(s) and/or price range etc.).

Further, once the one or more sets of substitutable items are received at the transceiver unit [102], the transceiver unit [102] provides the same to a processing unit [104]. The method thereafter at step [206] comprises determining, by the processing unit [104], for each of the plurality of digital platforms, a normalized demand value of each received set of substitutable items. For example, if the plurality of digital platforms comprises an e-commerce platform and its 2 competitor e-commerce platforms, and in the given example 2 sets of substitutable items (say one for an item bottle and other for an item pen) are received. Then the method in the given example comprises determining by the processing unit [104], for each of the e-commerce platform and its 2 competitor e-commerce platforms, a normalized demand value of each of the set of substitutable bottles and the set of substitutable pens.

Furthermore, the normalized demand value of each received set of substitutable items is determined based on a first dataset associated with the digital platform and a second dataset associated with the one or more competitor digital platforms of said digital platform. The first dataset comprises data indicating at least a demand of a plurality of substitutable items on the digital platform. The second dataset comprises data indicating at least a demand of a plurality of substitutable items on the one or more competitor digital platforms of the digital platform. The second dataset is a publicly available dataset and therefore may not provide an exact demand of the plurality of substitutable items on the one or more competitor digital platforms, therefore the normalized demand value of each received set of substitutable items is determined. Also, in an example for e-commerce platforms, the first dataset comprises data such as product page views, clicks on products, units etc. and the second dataset comprises data retrieved through web-crawls such as a count of ratings/reviews etc.

Once, the normalized demand value of said each received set of substitutable items is determined for each of the plurality of digital platforms, thereafter, at step [208] the method comprises determining, by the processing unit [104], a relative demand value of each received set of substitutable items based on the normalized demand value of said each received set of substitutable items determined for each of the plurality of digital platforms.

Next, at step [210] the method comprises identifying, by an identification unit [106], a first target digital platform for each received set of substitutable items, based on a demand weighted average selling price of said each received set of substitutable items for one or more of the plurality of digital platforms. More specifically, a first target digital platform for a set of substitutable items is a digital platform that is associated with a minimum demand weighted average selling price of said set of substitutable items. Also, the first target digital platform is identified from the plurality of digital platforms. Also, the demand weighted average selling price of each received set of substitutable items for the one or more of the plurality of digital platforms is determined based on at least one of the first dataset and the second dataset.

Next, at step [212] the method comprises identifying, by the identification unit [106], a second target digital platform for the one or more sets of substitutable items based on the first target digital platform identified for each received set of substitutable items and a relative demand value of said each received set of substitutable items. The second target digital platform is also identified from the plurality of digital platforms. Also, the second target digital platform for the one or more sets of substitutable items is a digital platform that is providing a better competitiveness value (i.e. a better price value) in a total market demand.

Thereafter, once the second target digital platform is identified for the one or more sets of substitutable items, an indication of the same is provided to the processing unit [104] by the identification unit [106]. Next, at step [214] the method comprises determining, by the processing unit [104], the competitiveness value for the one or more sets of substitutable items based on the second target digital platform identified for the one or more sets of substitutable items. More specifically, as the second target digital platform is the digital platform that is providing the better competitiveness value (i.e. a better price value) in a total market demand (i.e. in all of the one or more received sets of substitutable items), the method comprises determining by the processing unit [104], the competitiveness value for the one or more sets of substitutable items based on the second target digital platform.

After determining the competitiveness value for the one or more sets of substitutable items, the method terminates at step [216].

Furthermore, there are a number of use cases of the present invention, and few use cases are provided as below:

The implementation of the features of the present invention enables a digital platform to take pricing and selection decisions at a broader level rather than just focusing on a single item at a time.

The implementation of the features of the present invention provides market price transparency at scale, therefore it may help in negotiating better deals.

The implementation of the features of the present invention may help in optimizing discounts/offers on a common set of products on multiple digital platforms.

The present invention may help the digital platforms in creating value engineered products. Also, as it is not easy for the competitors to follow pricing for these value engineered products, it would enable a company to provide better value to the customers along with margin savings.

The present invention may also help in identifying the competitors pricing & selection strategy which can be leveraged for decision making across various initiatives.

The present invention may help in identifying a selection gap vs competition and help in selection & seller on-boarding decisions.

Thus, the present invention provides a novel solution of determining the competitiveness value for the one or more sets of substitutable items. Also, the present invention provides a technical advancement over the currently known solutions at least by providing a cohort based approach that enables a value benchmarking for a digital platform w.r.t. its competition, wherein the cohort/set of substitutable items is defined based on a category, an item type, a brand, one or more attributes and a price bucket. The present invention also provides a technical advancement over the currently known solutions by providing a solution for making a broader pricing and selection strategy which is not possible with the existing solutions. Also, the present invention provides a technical advancement over the currently known solutions by identifying a digital platform that is providing the best value in terms of price. Furthermore, the present invention also provides a technical advancement over the currently known solutions by identifying a digital platform that is providing a better price value in an overall market demand.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

We claim:

1. A method for determining a competitiveness value for one or more sets of substitutable items, the method comprising:

receiving, at a transceiver unit [102], the one or more sets of substitutable items, wherein each of the one or more sets of substitutable items is at least associated with an item-category present on a plurality of digital platforms, wherein the plurality of digital platforms comprises a digital platform and one or more competitor digital platforms of said digital platform;

determining, by a processing unit [104], for each of the plurality of digital platforms, a normalized demand value of each received set of substitutable items, wherein the normalized demand value of each received set of substitutable items is determined based on a first dataset associated with the digital platform, the first dataset including at least page views of one item of the one or more sets of substitutable items, clicks on one item of the one or more sets of substitutable items, and units of the one or more sets of substitutable items; and a second dataset associated with the one or more competitor digital platforms of said digital platform, the second dataset being retrieved from a web-crawl and including at least a count of ratings or reviews of the one or more sets of substitutable items;

determining, by the processing unit [104], a relative demand value of each received set of substitutable items based on the normalized demand value of said each received set of substitutable items determined for each of the plurality of digital platforms;

identifying, by an identification unit [106], a first target digital platform for each received set of substitutable items, based on a demand weighted average selling price of said each received set of substitutable items for one or more of the plurality of digital platforms;

identifying, by the identification unit [106], a second target digital platform for the one or more sets of substitutable items based on the first target digital platform identified for each received set of substitutable items and a relative demand value of said each received set of substitutable items; and determining, by the processing unit [104], the competitiveness value for the one or more sets of substitutable items based on the second target digital platform identified for the one or more sets of substitutable items.

2. The method as claimed in claim 1, wherein each set of substitutable items from the one or more sets of substitutable items is associated with at least one of a category type, an item type, a brand, one or more attributes and a price range.

3. The method as claimed in claim 1, wherein the first target digital platform and the second target digital platform are identified from the plurality of digital platforms.

4. The method as claimed in claim 1, wherein the first target digital platform is associated with a minimum demand weighted average selling price.

5. The method as claimed in claim 1, wherein the demand weighted average selling price of each received set of substitutable items for the one or more of the plurality of digital platforms is determined based on at least one of the first dataset and the second dataset.

6. The method as claimed in claim 1, wherein the first dataset comprises data indicating at least a demand of the one or more sets of substitutable items on the digital platform.

7. The method as claimed in claim 1, wherein the second dataset comprises a data indicating at least a demand of the one or more sets of substitutable items on the one or more competitor digital platforms of the digital platform.

8. A system for determining a competitiveness value for one or more sets of substitutable items, the system comprising:

a transceiver unit [102], configured to receive, the one or more sets of substitutable items, wherein each of the one or more sets of substitutable items is at least associated with an item-category present on a plurality of digital platforms, wherein the plurality of digital platforms comprises a digital platform and one or more competitor digital platforms of said digital platform;

a processing unit [104], configured to:

determine, for each of the plurality of digital platforms, a normalized demand value of each received set of substitutable items, wherein the normalized demand value of each received set of substitutable items is determined based on a first dataset associated with the digital platform, the first dataset including at least page views of one item of the one or more sets of substitutable items, clicks on one item of the one or more sets of substitutable items, and units of the one or more sets of substitutable items; and a second dataset associated with the one or more competitor digital platforms of said digital platform, the second dataset being retrieved from a web-crawl and including at least a count of ratings or reviews of the one or more sets of substitutable items, and determine, a relative demand value of each received set of substitutable items based on the normalized demand value of said each received set of substitutable items determined for each of the plurality of digital platforms; and an identification unit [106], configured to:

identify, a first target digital platform for each received set of substitutable items, based on a demand weighted average selling price of said each received set of substitutable items for one or more of the plurality of digital platforms, and identify, a second target digital platform for the one or more sets of substitutable items based on the first target digital platform identified for each received set of substitutable items and a relative demand value of said each received set of substitutable items, wherein:

the processing unit [104], is further configured to determine the competitiveness value for the one or more sets of substitutable items based on the second target digital platform identified for the one or more sets of substitutable items.

9. The system as claimed in claim 8, wherein each set of substitutable items from the one or more sets of substitutable items is associated with at least one of a category type, an item type, a brand, one or more attributes and a price range.

10. The system as claimed in claim 8, wherein the first target digital platform and the second target digital platform are identified from the plurality of digital platforms.

11. The system as claimed in claim 8, wherein the first target digital platform is associated with a minimum demand weighted average selling price.

12. The system as claimed in claim 8, wherein the demand weighted average selling price of each received set of substitutable items for the one or more of the plurality of digital platforms is determined based on at least one of the first dataset and the second dataset.

13. The system as claimed in claim 8, wherein the first dataset comprises data indicating at least a demand of the one or more sets of substitutable items on the digital platform.

14. The system as claimed in claim 8, wherein the second dataset comprises a data indicating at least a demand of the one or more sets of substitutable items on the one or more competitor digital platforms of the digital platform.

* * * * *